Nov. 6, 1945.  C. M. OSTERHELD  2,388,564
THERMAL RETARDER SWITCH UNIT
Filed Nov. 22, 1943   3 Sheets-Sheet 1
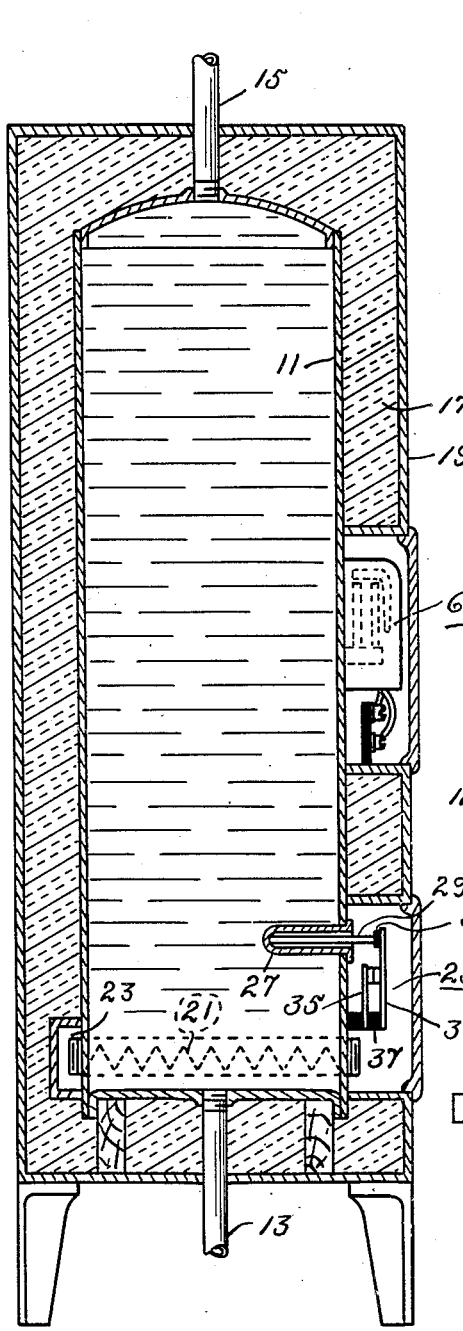
Fig-1
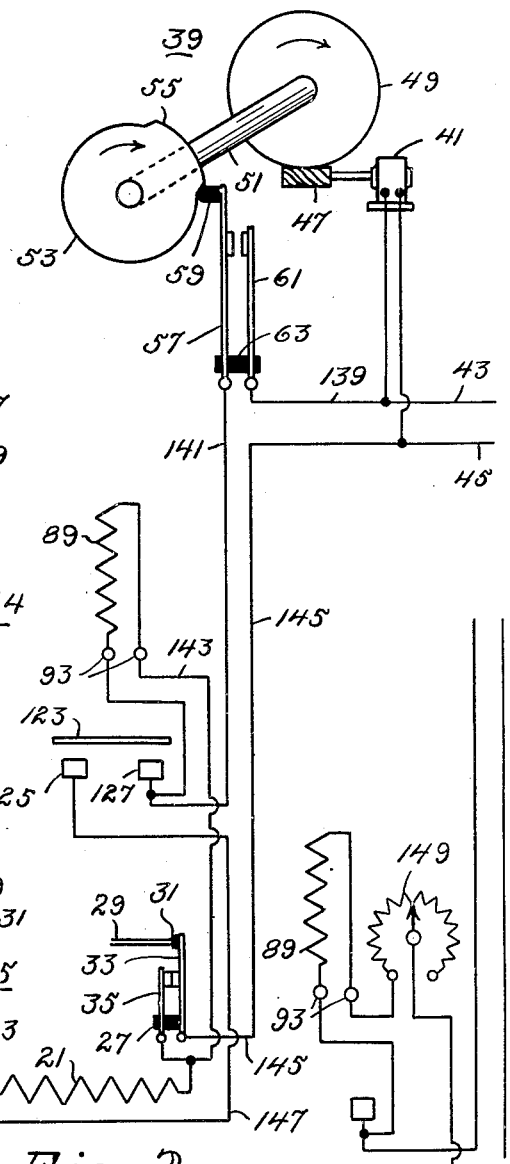
Fig-2
Fig-3
INVENTOR.
CLARK M. OSTERHELD
BY
H M Bielel
ATTORNEY

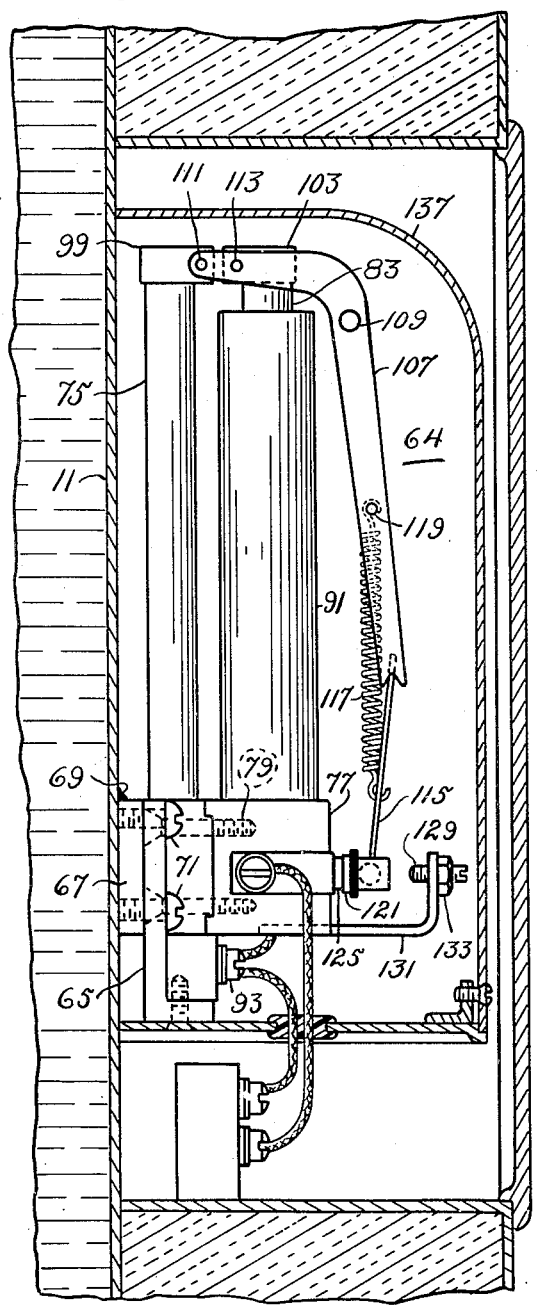
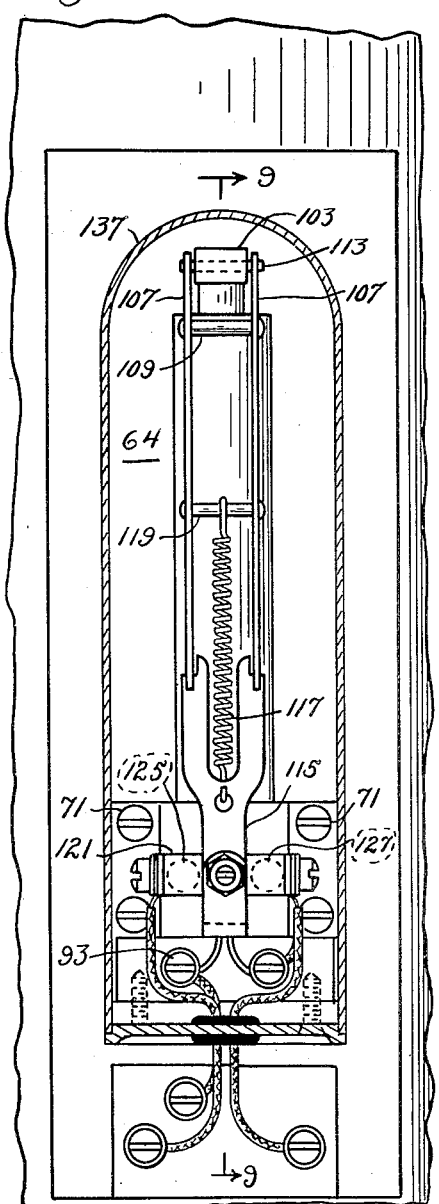

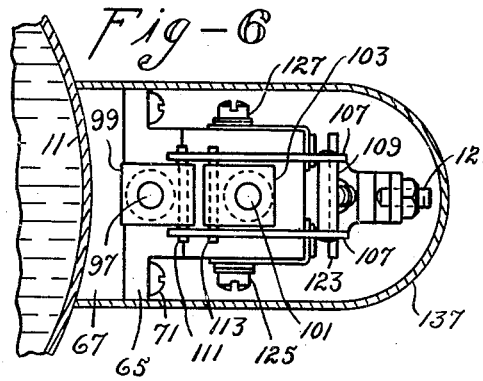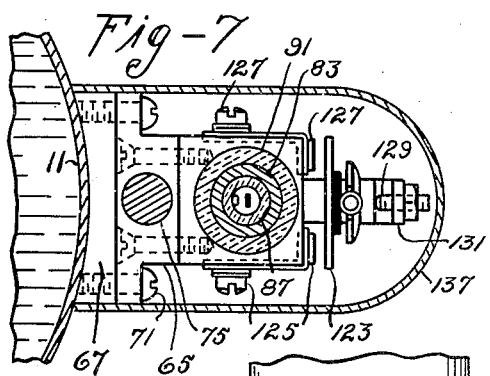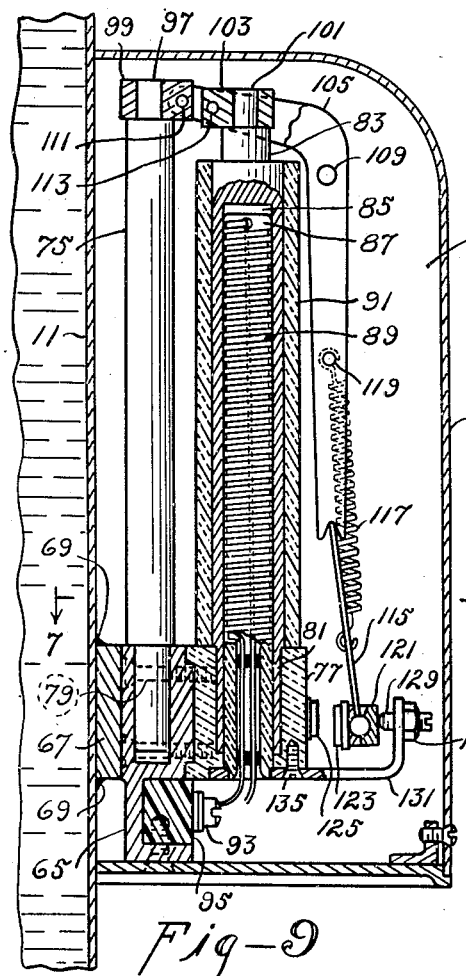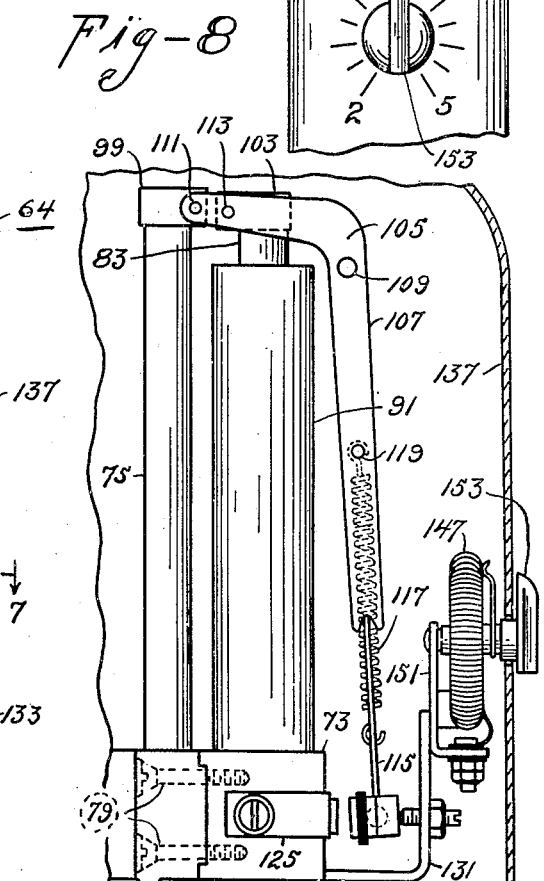

Patented Nov. 6, 1945

2,388,564

UNITED STATES PATENT OFFICE 2,388,564

THERMAL RETARDER SWITCH UNIT

Clark M. Osterheld, Stoughton, Wis., assignor to McGraw Electric Company, Elgin, Ill., a corporation of Delaware Application November 22, 1943, Serial No. 511,387

26 Claims. (Cl. 219—39)

My invention relates to electric heating and particularly to control devices to be used in control systems for electric water heaters.

An object of my invention is to provide a thermal retarder heater control switch unit adapted to be mounted in heat-conducting relation to a hot water tank to selectively cause energization of an electric heater for the tank either immediately or with a time delay period in accordance with the amount of withdrawal of hot water from the tank.

Another object of my invention is to provide a thermal retarder heater control switch unit comprising a first expansion member, a second expansion member, of different thermal expansivity and a switch member actuable by the two expansion members to control a tank water heater.

Other objects of my invention will either be apparent from a description of one form of device embodying my invention or will be pointed out in the course of such description and set forth particularly in the appended claims.

In the drawings:

Figure 1 is a vertical, sectional view of a hot water tank having operatively associated therewith a device embodying my invention, Fig. 2 is a diagram of the control circuits with the contacts in position when the tank contains hot water at its center portion, and cold water at the bottom portion just before the start of an off-peak period, Fig. 3 is a fragmentary diagram of a circuit showing a manually-adjustable rheostat connected in series with a retarder heating coil, Fig. 4 is a side elevational view of a thermal retarder unit mounted on a tank, with its cover shown in section and with the contact in closed position as when the thermal retarder is subject to cold water, Fig. 5 is a front view of the parts shown in Fig. 4, Fig. 6 is a top plan view of the parts shown in Fig. 9, Fig. 7 is a sectional view on the line 7—7 of Fig. 9, Fig. 8 is a fragmentary front view of the retarder case showing an adjusting button for the resistance coil shown in Fig. 3, Fig. 9 is a vertical, sectional view on the line 9—9 of Fig. 5 with the position of the contact of the switch as when the tank contains hot water at the center portion, and, Fig. 10 is the same as Fig. 4 except showing the adjustable rheostat of Fig. 3 and with the contact about to assume the closed position.

Referring first of all to Fig. 1 of the drawings, I have there shown a domestic hot water tank 11 which may be provided with a cold water inlet pipe 13 at the lower end thereof and with an upper hot water outlet pipe 15. The tank 11 may be surrounded by a mass 17 of heat insulation, such as mineral wood, which may be held in proper operative position around the tank 11 by an outer casing 19 all in a manner now well known in the art.

I provide an electric heater 21 which may be of any suitable kind now well known in the art but is illustrated as a clamp-on heater engaging the outer peripheral surface of the tank and positioned in a tunnel member 23. While I have shown only a single heater I do not desire to be limited thereto but when only a single electric heater is used it will be mounted at the lower end portion of the tank.

I provide a first thermally-actuable heater control switch designated generally by the numeral 25 and comprising a tube 27 having a closed inner end and having its open outer end portion secured in fluid-tight relation in an opening in the tank immediately above the heater 21. An expansion rod 29 is positioned within the tube 27 and is adapted to engage a block 31 of electric-insulating material mounted on the free end of a resilient contact bar 33 which is normally in contacting engagement with a substantially rigid bar 35 but may be disengaged therefrom by expansion of the expansion rod 29. I may support the two contact arms 33 and 35 as by blocks 37 of electric-insulating material. I desire it to be understood that showing of the lower thermally-actuable heater control switch is schematic only and that I may use any other form of device effective for the same purpose, which purpose is to cause closure of the switch when the tube 27 is subject to cold water (the temperature of which may be assumed to be on the order of 70° F.) and to be in open position when subject to hot water in the tank, the temperature of which may be assumed to be on the order of 150° F.

I provide a time controlled switch unit 39 which includes a subsynchronous electric motor 41, the terminals of which may be connected to two supply circuit conductors 43 and 45. A worm 47 is positioned on the end of the rotor shaft of motor 41 and engaged with a worm gear 49 which is mounted on a suitable shaft 51. The shaft 51 has fixedly mounted thereon a cam disc 53 having a fixed radius for substantially three-quarters of its periphery, the other quarter being of somewhat larger radius and being designated by 55. It is to be understood that the design, construction and operation of the time controlled switch unit 39 is such that cam disc 53 will be rotated through one complete turn of 360° during a twenty-four hour day, and further that the peripheral extent of portion 55 is substantially that of an off-peak period on the lines of the station to which the supply circuit conductors 43 and 45 are connected. Usually the off-peak period is adjudged to extend from substantially 12 midnight to 6 a. m. However, I do not desire to be limited to this since the cam disc 53 may have other off-peak portions thereof similar to and spaced from the portion 55, and the peripheral extent of portion 55 may be greater, extending from say 10 p. m. to 7 a. m. in accordance with the ideas of the engineers of the electric supply company.

A heater control switch actuable by the cam disc 53 includes a substantially resilient contact arm 57 having a lug 59 of electric-insulating material mounted thereon at its free end and adapted to engage the peripheral surface of the cam disc 53, the major portion of which is of smaller radius to hold the contact arm 57 out of engagement with a substantially rigid contact arm 61, the two contact arms being held in proper operative positions relative to each other as by a block or blocks of electric-insulating material 63. It is to be understood that when lug 59 engages the peripheral portion 55 of cam disc 53 the two contact arms 57 and 61 will be in contacting and circuit closing position.

I provide a thermal retarder heater control switch unit 64 comprising a block 65 of heat-conducting material having high thermal conductivity. Block 65 may be held against the outer surface of a block 67 of high heat-conducting metal or alloy which may be secured against the outside surface of the tank as by welding seams 69. It is to be understood that the inner surface of block 67 has an arcuate shape so as to provide a large area of contact with the outside surface of the tank. Here again I do not desire to be limited to the use of welding seams but may use any other means for obtaining a heat-conducting path of low thermal reluctance between the tank 11 and the supporting block 65, which may be secured to block 67 as by a plurality of machine screws 71. Supporting block 65 may be provided with an opening 73 therein to receive the reduced lower end portion of a first expansion rod 75 which is preferably made of a high-expansion material, such as aluminum.

I provide a supporting block 77 of heat-insulating and electric-insulating material which may be held against the outer surface of block 65 as by machine screws 79 and may be of asbestos lumber or Micalex. Block 77 is provided with an opening 81 therein to receive the lower reduced end portion of a second expansion rod 83 which is of lesser thermal expansivity than rod 75 and may be made of a nickel steel or of a chrome steel. The second expansion rod 83 is supported by heat-insulating supporting block 77 to extend substantially parallel with the first expansion rod 75 and spaced therefrom a short distance.

Rod 83 is provided with a bore 85 therein in which may be located a support 87 of electric-insulating material which is arranged to have mounted thereon a low-wattage heating coil 89. Bore 85 extends from the lower end of rod 83 to substantially the upper end thereof, although here again I do not desire to be limited to the location of heating coil 89 within a bore 85. An outer heat-insulating casing 91 is provided around the second expansion rod 83 not only to make the rod more or less independent of the temperature of the ambient air but also to permit of using a low-wattage heating coil, as well as to prevent affecting the other parts of the thermal retarder switch unit by the heat of coil 89.

The end portions of heating coil 89 may be connected to terminals 93 which may be mounted on a block 95 of electric-insulating material supported by the lower portion of support 65, or in any other suitable or desired manner.

The reduced upper end portion 97 of rod 75 may have fixedly secured thereto a laterally-extending arm 99, while the reduced upper end portion 101 of the second expansion rod 83 may have rigidly secured thereto an arm 103. These two laterally-extending arms on the two expansion rods extend to within a short distance from each other.

A switch controlled jointly by the two expansion rods 75 and 83 includes an upper toggle member 105, of substantially L-shape, which comprises two arms 107 spaced apart as by an upper short rod 109 rigidly secured to the two arms 107 at the upper end of a vertically-extending portion of the toggle arm. The upper inner end portion of the substantially horizontally-extending portion is pivotally supported as by trunnions 111 and 113 extending through the two arms 107 and into the arms 99 and 103 respectively.

A lower toggle member 115 has pivotal engagement, at its upper end, with the lower end portions of the arms 107 and an over center spring 117 connects the two in a manner well known in the art and used for snap acting operation. The upper end of spring 117 is connected to a cross bar 119 extending through the two arms 107 below the upper cross rod 109, while the lower end of spring 117 is connected to the intermediate portion of lower toggle arm 115.

The lower end of toggle arm 115 has mounted thereon a cross bar 121, the inner surface of which has secured thereagainst a contact bridging member 123 insulatedly mounted against member 121. Contact bridging member 123 is adapted to engage with and be disengaged from two contact terminals 125 and 127. A stop member 129 which may have the shape of a machine screw is supported by a bracket 131 with which it has screw-threaded engagement and in which it may be held in adjusted position as by a lock nut 133. Bracket 131 may be held in proper operative position as by a plurality of machine screws 135 holding it against the lower surface of block 77. I provide a suitable outer casing 137 to cover the thermal retarder switch unit.

Referring now to Figs. 2 and 3 of the drawings I have there shown that supply circuit conductor 43 is connected with contact arm 61 as by a conductor 139. Contact arm 57 is connected by a conductor 141 with contact terminal 127 as well as with one terminal of the heating coil 89. The other terminal of the heating coil 89 is connected by a conductor 143 with one terminal of the electric heater 21 and with the rigid contact bar 35. The resilient contact bar 33 is connected by a conductor 145 with supply circuit conductor 45. The other terminal of heater 21 is connected by a conductor 147 with contact terminal 125. In order to vary the amount of heat generated in heating coil 89 I may provide an adjustable rheostat 149 which, as may be seen in Fig. 10 of the drawings, may be supported on a bracket 151 secured to bracket 131 in such position that an adjusting knob 153 may be positioned in front of casing 137.

The conditions under which the thermal retarder heater control switch must operate may be briefly stated as follows:

The timer controlled switch is adapted to maintain the energizing circuit for heater 21 in closed operating condition during the off-peak periods of a twenty-four hour day and, for illustrative purposes, the off-peak periods may be considered to extend from 12 midnight to 6 a. m., although a particular electric utility station may find that it may have other off-peak periods during a twenty-four hour day or that its off-peak period during the late night hours may be different than from 12 midnight to 6 a. m. The tank may be filled with cold water either at the start-off of use thereof or at any time during use and operation of the system. In this case the lower thermally-actuable heater control switch 25 will be in closed position. The thermal retarder heater control switch unit will also be in closed position since the high expansion member 75 will be subject to the temperature of cold water with the result that the length of this expansion rod will be a minimum whereby closure of the switch controlled thereby is effected. The timer controlled circuit switch including the contact arms 57 and 61 may be in open position if the time is during an on-peak period or it may be closed, as will occur shortly after the time when the parts of the switch 39 are in the positions shown in Fig. 2 of the drawings.

Another condition is that when substantially all of the water in the tank is heated to a predetermined relatively high temperature, which may be on the order of 150° F., the lower thermal switch 25 is in open position, as is also the thermal retarder switch unit, since both expansion members are subject to the temperature of hot water, and if this continues for a prolonged period their temperatures will be on the order of 150° F. with the result that the switch will be in open position.

Another condition is when a relatively small quantity of hot water has been withdrawn from the tank, the quantity of cold water entering the tank being sufficient only to subject the lower heater control switch to cold water in which case the lower switch will be in closed position.

Another condition is that when a greater quantity of hot water has been withdrawn from the tank with the result that the thermal retarder switch unit is subject to cold water in which case the switch actuated thereby will be in closed position.

Let it be assumed that the tank has been filled with cold water and that the time is substantially 12 midnight, or a short time thereafter, so that circuit switch comprising contact arms 57 and 61 will be in closed position. The cold water will have closed the lower thermal switch 25 as well as the thermal retarder switch unit with the result that immediate energization of the heater 21 will take place and the water in the tank will be heated up.

If it be assumed that it will require say six hours of continuous energization of the heater 21 to heat all of the water in the tank to say 150° F. and if the thermal retarder switch unit be mounted on the tank at substantially the mid point thereof, it would require about three hours to heat enough water to subject the thermal retarder switch unit to the temperature of hot water. This would cause temperature rise of the first expansion rod 75 and attendant increase in its length.

The closure of the timer controlled switch 39 as well as of the lower heater control switch 25 will cause energization of the heating coil 89 of the thermal retarder switch unit and it may be assumed, for illustrative purposes, that the rheostat 149 has been so adjusted that it will take three hours to have the temperature of the second rod 83 raised to a value of say 300° F., with attendant increase in its length to substantially the same as that of the rod 75 heated by heat conducted thereto from the hot water in the tank. Under these conditions the thermal retarder switch would remain in closed position and energization of the heater 21 would continue for say three hours more or until substantially all of the water in the tank is hot, when the lower switch 25 would open. Thus if all of the water in the tank were heated before 6 a. m. the heater 21 would be deenergized by the lower switch 25, but if not all of the water in the tank were heated up by 6 a. m., the heater 21 would be deenergized by opening of the timer controlled switch 39 at 6 a. m.

If the length of time required for the second expansion rod 83 to be heated enough to cause its length to be substantially equal to that of rod 75 (when the latter is subject to the temperature of hot water in the tank) should be four hours, the thermal retarder heater control switch would be moved to open position at the end of three hours, and would remain in that position for one hour until the second rod reached a sufficiently high temperature and increased length to cause reclosure of the thermal retarder switch and reenergization of heater 21.

It is obvious that the wattage of the tank heater 21 relative to the size of tank 11 will affect the length of time required to heat all of the water in the tank. While I have shown a means to vary the length of time required to heat the second expansion rod to its maximum temperature, in actual use no such adjusting means would be installed, since the electric utility company would probably install a different heating coil for the second expansion element to ensure that the user would not adjust the device wrongly or unnecessarily.

Let it now be assumed that the tank was substantially filled with hot water at the end of the off-peak period and that during the on-peak period only a relatively small amount of hot water was used, which withdrawal of hot water permits only sufficient cold water to enter the tank to cause subjection of the tube 27 to cold water with the result of closing the lower switch 25. During the on-peak period of the day closure of the switch 25 will have no result, but as soon as the timer controlled switch is closed at the start of an off-peak period energization of the heating coil 89 of the thermal retarder switch unit will occur with the result that after an adjustably predetermined time period of delay the thermal retarder switch will be moved to closed position with the result of energization of heater 21, and if the amount of cold water in the lower portion of the tank was such that it could be heated to a temperature of around 150° F. within the off-peak period, deenergization of the heater 21 will be effected by opening of control switch 25.

On the other hand, let it be assumed that the use of hot water was such as to cause the upper level of cold water in the tank to be above the point of connection of the thermal retarder switch to the tank, the thermal retarder switch as well as the lower thermally-actuable heater control switch would both be in closed position with the result that energization of heater 21 would occur immediately upon closure of the timer control switch at the start of an off-peak period.

When this latter condition obtains, that is when sufficient cold water is in the tank to subject the thermal retarder switch unit to cold water, the temperature of the water to which thermal retarder switch unit is subjected, may increase, during the heating-up of the cold water, to a temperature on the order of 115°; and the design, construction and operation of the thermal retarder switch and particularly of the snap-acting switch member is such that this switch will remain in closed position to cause continuation of the energization of the heater 21.

I wish to here point out that a companion case, filed as of even date herewith (S. N. 511,386) and assigned to the same assignee as is the present case, covers the system including the lower thermally-actuable heater control switch, the timer controlled circuit switch and the thermal retarder heater control switch unit all connected in series circuit with each other and with the heater, while the present application covers more particularly the details of construction of the thermal retarder switch unit itself.

Various modifications may be made in the details of construction of the thermal retarder switch unit without departing from the spirit and scope thereof and all such structures clearly coming within the appended claims are to be considered a part thereof.

I claim as my invention:

1. A thermal retarder switch unit for controlling the energization of an electric heater for a hot water tank, comprising two fixedly supported parallel-extending thermo-sensitive elements and a single switch operated by change in the relative thermal condition of the two elements, one of said elements being subject to heat exchange with water in the tank and means independent of the tank and of the position of said switch for exchanging heat with the other element.

2. A thermal retarder switch unit for controlling the energization of an electric heater for a hot water tank, comprising a switch lever and two fixedly supported parallel-extending thermo-sensitive elements jointly supporting and mechanically acting upon the switch lever at different points one of said elements being subject to heat exchange with water in the tank and the other being subject to heat exchange independent of the tank and of the position of said switch.

3. A thermal retarder switch unit for controlling the energization of an electric heater for a hot water tank, comprising a switch lever and two fixedly supported parallel-extending thermo-sensitive elements jointly supporting and mechanically acting on the switch lever at different points, one of said elements being adapted to be subject to heat interchange with water in the tank and means for changing the temperature of the other elements independent of the tank water temperature and of the position of said switch.

4. A thermal retarder switch unit for controlling the energization of an electric heater for a hot water tank, comprising a switch lever and two fixedly supported, parallel-extending thermo-sensitive elements jointly supporting and mechanically acting upon the switch lever at different points, means for thermally connecting one of said elements with the tank for heat exchange with the tank water and means for heating the other elements directly independent of the tank water and of the position of said switch.

5. In a device of the class described a switch and means for operating said switch including two fixedly supported, parallel-extending rods of different thermal expansion acting on the switch and means independent of the position of the switch for heating one of said rods.

6. A thermal retarder tank heater control switch operating device including two fixedly supported, parallel-extending differently thermally-expansible elements acting jointly to mechanically operate the switch, means for thermally connecting one of the elements with tank water and means independent of the position of the switch for heating the other element.

7. In a thermal retarder switch unit for a hot water storage tank heater, a switch arm and two actuating devices each including a thermally-expansible fixedly supported rod acting on the arm in the same direction at a different point from the other, means for connecting one of the devices for heat exchange with water in the tank and means independent of the position of said switch for changing the temperature of the other device.

8. A thermal retarder switch unit for a hot water storage tank heater comprising two dissimilarly thermally-responsive fixedly supported, parallel-extending elements, means for subjecting one of said elements to heat exchange with water in the tank and means for heating the other element independent of tank water and of the position of said switch, said switch being in closed position when the temperatures of the two elements are at substantially ordinary room value.

9. A thermal retarder switch unit for a hot water storage tank electric heater comprising two dissimilarly thermally-responsive fixedly supported, parallel-extending elements, means for subjecting one of said elements to heat exchange with water in the tank and means for heating the other element independent of tank water, said switch being in closed position when the temperatures of the two elements are at substantially ordinary room value, and also when the two elements are at different predetermined relatively high values.

10. A thermal retarder switch unit for a hot water storage heater comprising two dissimilarly thermally-responsive fixedly supported, spaced, parallel-extending elements, means for subjecting one of said elements to heat exchange with water in the tank and means independent of the position of the switch for heating the other element independent of tank water, said switch being in open position when said one element is subject to hot water and said other element is at substantially ordinary room temperature.

11. A thermal retarder heater control switch unit for an electric heater for a hot water tank, comprising a first fixedly supported thermally-expansible means, a second fixedly supported thermally-expansible means, a fixed heat-insulating support for said second means, a heat-conducting support for said first means adapted to be mounted in good heat conducting relation to the tank, an electric heating coil for said second means, a heater control switch movable by said two thermally-expansible means into closed position when said two thermally-actuable means are at substantially ordinary room temperature and when they are at different predetermined relatively high values.

12. A thermal retarder switch unit for controlling the energization of an electric heater for a hot water tank, comprising a first high expansion rod, a second low expansion rod, a heat-conducting support for the first rod adapted to be mounted in heat-conducting relation to a tank, a heating coil for said second rod, a heat-insulating support and cover for said second rod and a heater control switch movable by said two rods into closed position when said first rod is subject to the temperature of cold water in a tank and said second rod is at substantially ordinary room temperature.

13. A thermal retarder switch unit for controlling the energization of an electric heater for a hot water tank, comprising a first high expansion rod, a second low expansion rod, a heat-conducting support for the first rod adapted to be mounted in heat-conducting relation to a tank, a heating coil for said second rod, a heat-insulating support and cover for said second rod and a heater control switch movable by said two rods into closed position when said two rods are at different predetermined relatively high values.

14. A thermal retarder switch unit for controlling the energization of an electric heater for a hot water tank, comprising a first high expansion rod, a second low expansion rod, a heat-conducting support for the first rod adapted to be mounted in heat-conducting relation to a tank, a heating coil for said second rod, a heat-insulating support and cover for said second rod and a heater control switch movable by said two rods into closed position when said first rod is subject to the temperature of cold water in a tank and said second rod is at substantially ordinary room temperature, and also when said first rod is subject to the temperature of cold water in the tank and said second rod is at a predetermined relatively high value.

15. A thermal retarder switch unit for controlling the energization of an electric heater for a hot water tank, comprising a first high expansion rod, a second low expansion rod, a heat-conducting support for the first rod adapted to be mounted in heat-conducting relation to a tank, a heating coil for said second rod, a heat-insulating support and cover for said second rod and a heater control switch movable by said two rods into closed position when said two rods are at substantially ordinary room temperature and when the two rods are at different predetermined relatively high values.

16. A thermal retarder heater control switch unit for an electric heater associated with a hot water tank, comprising a first thermally-expansible rod, a heat-conducting support for the first rod adapted to be mounted in heat-conducting relation to a hot water tank, a second thermally-expansible rod, a heat-insulating support for said second rod supported by said heat-conducting support for said first rod, a heating coil for said second rod and a switch lever pivotally supported by said rods and movable thereby into closed position when said two rods are at ordinary room temperature, movable into open position when both rods are at an intermediate temperature and movable into closed position when the two rods are at different predetermined relatively high temperatures.

17. A thermal retarder heater control switch unit for an electric heater operatively associated with a hot water tank, comprising a first thermally-expansible rod, a heat-conducting support for the first rod adapted to be mounted in heat-receiving relation to a tank, a second thermally-expansible rod, a heat-insulating support for said second rod holding said second rod in parallel spaced relation to said first rod and supported by said heat-conducting support for the first rod, a heating coil for said second rod and a switch member operatively pivotally engaged at different points by said two rods and movable thereby into closed position when said two rods are at ordinary room temperature, movable into open position when said first rod is subject to the temperature of hot water in the tank and said heating coil has been energized less than a predetermined length of time and movable into closed position when said first rod is subject to the temperature of hot water and said heating coil has been energized a predetermined length of time.

18. A thermal retarder switch unit for an electric heater for a hot water tank, comprising a high-expansion rod, a heat-conducting support for said rod mounted in heat-receiving relation on a hot water tank, a low-expansion rod, a heat-insulating support for said low-expansion rod supported by said heat-conducting support, an electric heating coil for said low-expansion rod and a heater control switch member operatively supported by said two rods and movable thereby into closed position when said two rods are at ordinary room temperature, movable into open position when said high-expansion rod is subject to the temperature of hot water in the tank and said heating coil has been energized less than a predetermined length of time and movable into closed position when said high-expansion rod is subject to the temperature of hot water in the tank and said heating coil has been energized a predetermined length of time.

19. A thermal retarder heater control switch unit as set forth in claim 17 and including manually-actuable means for varying said predetermined length of time.

20. A thermal retarder heater control switch unit as set forth in claim 18 and including manually-actuable means for varying said predetermined length of time.

21. A thermal retarder heater control switch unit comprising a high expansion thermally-expansible element, a low expansion thermally-expansible element, means for supporting said two elements in spaced parallel-extending relation to each other, a switch arm pivotally supported by said two elements and an electric heating coil on said low expansion element, said switch being in closed position when the temperatures of said elements are substantially the same and on the order of 60° F. to 115° F., in open position when the temperatures of said elements are substantially the same and on the order of 150° F. and in closed position when the temperature of the high expansion element is on the order of 150° F. and the temperature of the low expansion element is on the order of 250° F.

22. A thermal retarder heater control switch unit for a hot water storage tank heater comprising a switch, two dissimilarly thermally-expansible members connected to and acting on the switch, means for thermally connecting one of said members for heat exchange with water in the tank and a heating coil for the other member, said switch being adapted to be held in closed position when said one member is subject to cold water in the tank, to be moved into open position when said one member is subject to hot water in the tank and to be moved into closed position with a predetermined time delay period upon energization of said heating coil when said one member is subject to hot water in the tank.

23. A thermal retarder heater control switch unit for a hot water storage tank heater comprising a switch arm, two dissimilarly thermally-expansible rods, pivotally supporting said switch arm and acting thereon at different points, at least one of said rods being in close heat-receiving relation with the water in the tank and an electric heating coil for the other rod.

24. A thermal retarder heater control switch unit for a hot water storage tank heater comprising a switch arm, two dissimilarly thermally-expansible rods, pivotally supporting said switch arm and acting thereon at different points, at least one of said rods being in close heat-receiving relation with the water in the tank and an electric heating coil for the other rod, said switch arm being adapted to be held in closed position when the temperatures of said rods are at values on the order of 60° F. to 115° F., to be held in open position when the temperatures of said rods are at values on the order of 150° F. and to be held in closed position when said one rod is at a temperature on the order of 150° F. and the other rod is at a temperature on the order of 250° F.

25. A thermal retarder heater control switch unit for a hot water storage tank heater, comprising two dissimilarly thermally-expansible rods fixedly supported in spaced parallel-extending relation on a tank, a switch arm pivotally supported by said rods at two spaced points on the arm, at least one of said rods being in close heat-receiving relation with the water in the tank and an electric heating coil on the other rod.

26. A thermal retarder switch unit for controlling the energization of an electric heater for a hot water tank, comprising two fixedly supported, spaced, parallel-extending thermo-sensitive elements and a switch supported jointly by said elements and operated by changes in the relative thermal condition of the two elements, one of said elements being subject to heat exchange with water in the tank and means independent of the tank and of the position of said switch for exchanging heat with the other element.

CLARK M. OSTERHELD.